United States Patent
Kim

(10) Patent No.: US 10,364,883 B2
(45) Date of Patent: Jul. 30, 2019

(54) SHIFT LEVER ASSEMBLY FOR VEHICLE

(71) Applicant: Hyundai Motor Company, Seoul (KR)

(72) Inventor: Eun Sik Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 329 days.

(21) Appl. No.: 15/587,575

(22) Filed: May 5, 2017

(65) Prior Publication Data

US 2018/0156327 A1 Jun. 7, 2018

(30) Foreign Application Priority Data

Dec. 6, 2016 (KR) .......................... 10-2016-0165306

(51) Int. Cl.
| | | |
|---|---|---|
| *F16H 59/02* | (2006.01) | |
| *F16H 59/10* | (2006.01) | |
| *F16H 59/12* | (2006.01) | |

(52) U.S. Cl.
CPC ..... *F16H 59/0204* (2013.01); *F16H 59/0278* (2013.01); *F16H 59/105* (2013.01); *F16H 59/12* (2013.01)

(58) Field of Classification Search
CPC ............ F16H 59/0204; F16H 59/0278; F16H 59/105; F16H 59/12
See application file for complete search history.

(56) References Cited

U.S. PATENT DOCUMENTS

| | | | | |
|---|---|---|---|---|
| 4,843,901 A | * | 7/1989 | Peterson | F16H 59/12 74/335 |
| 5,265,018 A | * | 11/1993 | Sokol | B60W 10/10 192/32 |
| 2011/0023646 A1 | * | 2/2011 | Hanjono | F16H 59/0278 74/473.3 |
| 2015/0135878 A1 | * | 5/2015 | Park | F16H 59/0204 74/473.24 |
| 2016/0178050 A1 | * | 6/2016 | Park | F16H 59/0204 74/473.18 |
| 2017/0108116 A1 | * | 4/2017 | Kim | F16H 59/0217 |
| 2017/0356543 A1 | * | 12/2017 | Turney | F16H 59/0204 |
| 2019/0145510 A1 | * | 5/2019 | Moreno Colom | F16H 59/10 |

FOREIGN PATENT DOCUMENTS

KR 20-0479639 Y1 2/2016

* cited by examiner

*Primary Examiner* — Terence Boes
(74) *Attorney, Agent, or Firm* — Morgan, Lewis & Bockius LLP

(57) ABSTRACT

A shift lever assembly for a vehicle may include a knob disposed above a base, has an accommodation space formed therein, and includes a button type shift device disposed in the accommodation space to perform shifting in response to button operations, wherein a cover opens or closes the accommodation space of the knob, a rod extends downward from the knob and through a hole of the base and having a magnet disposed on a bottom portion thereof, a driving motor includes a rotation shaft connected to the rod and providing a driving force for rotating the knob at the time of driving, a shifting PCB detects a gear by recognizing the magnet and controlling the gear, and shifting is performed by selectively using one of a lever shift mode and a button shift mode.

11 Claims, 9 Drawing Sheets

SHIFT LEVER ASSEMBLY FOR VEHICLE

CROSS-REFERENCE(S) TO RELATED APPLICATIONS

The present application claims priority to Korean Patent Application No. 10-2016-0165306, filed Dec. 6, 2016, the entire contents of which is incorporated herein for all purposes by this reference.

BACKGROUND OF THE INVENTION

Field of the Invention

The present invention relates generally to a shift lever assembly for a vehicle, the shift lever assembly being configured to prevent an error in shifting and improve the feeling of operation by reducing a size of a shift lever and improving visibility.

Description of Related Art

Generally, in existing automatic transmission vehicles, park (P), reverse (R), neutral (N), and drive (D) gears (or shift stages) are linearly disposed, wherein one of the gears can be selected by pivoting a shift lever. When the shift lever pivots, a cable is pulled, resulting in an operating force thereof being transferred to a transmission.

Since a point at which the cable is connected to the shift lever is spaced apart upward from the pivot center of the shift lever, the cable is pulled or released according to the pivot angle thereof when the shift lever is pivoted. Accordingly, the operating force of the shift lever is transferred to the transmission, and in response to the transferred operating force, the gears are changed.

In addition, in a conventional automatic transmission vehicle, a shift lever protrudes from a console and is operated in a similar manner to the shift lever of a conventional mechanical transmission vehicle. Accordingly, the shift lever has the same feeling of operation as the shift lever of the conventional mechanical transmission vehicle. As a relatively large space is occupied by the shift lever, the console may not have a storage space. In addition, since the shift lever protrudes from the console, there is a problem in that a driver's head may hit the shift lever during a vehicle accident, whereby the driver may be injured.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY aspects of the present invention are directed to providing a shift lever assembly for a vehicle, the shift lever assembly having a hybrid structure able to realize both a lever shift mode and a button shift mode using a single shift-by-wire (SBW) system, thereby improving a product value and reliability.

an aspect of the present invention, a shift lever assembly for a vehicle may include: a base having a hole; a knob disposed above a base, having an accommodation space formed therein to be opened or closed by a cover, and including a button type shift device disposed in the accommodation space to perform shifting in response to button operations; a rod extending downward from the knob and through the hole and having a magnet disposed on a bottom portion thereof; a driving motor including a rotation shaft connected to the rod and providing a driving force for rotating the knob at the time of driving; and a shifting printed circuit board (PCB) detecting a gear by recognizing the magnet and controlling the gear. Shifting is performed by selectively using one of a lever shift mode, in which gears are changed in response to the knob being operated, and a button shift mode, in which the gears are changed in response to button operations.

The button type shift device may include a panel including shift buttons, a button recognition PCB connected to the panel to recognize operations of the shift buttons, and a rotation motor rotating the cover.

The shift buttons may include a reverse gear button, a neutral gear button, and a drive gear button selectively and sequentially disposed in a top-bottom direction.

The knob may further include a rotation button disposed on a top portion thereof. The rotation button, the button recognition PCB, and the rotation motor may be connected by wires, wherein, in response to the rotation button being operated, the rotation motor is driven to rotate the cover so that the shift buttons are exposed.

The cover may include a separator diaphragm therein, the separator diaphragm being disposed below a bottom surface of the panel in a transverse direction of the vehicle and having a coupling hole formed at a center thereof. The rotation shaft of the rotation motor may be coupled to the coupling hole of the cover, wherein the cover is rotated when the rotation motor is rotated.

The rod may include a cylindrical penetration portion on a bottom end portion thereof, the rod being oriented perpendicular to a side surface of the cylindrical penetration portion. The driving motor may be coupled to the rod, with the rotation shaft of the driving motor being fitted into the cylindrical penetration portion of the rod, wherein the rod is pivoted in a front-rear direction of the vehicle when the driving motor is driven.

The magnet may be disposed on a bottom surface of the circumferential surface of the cylindrical penetration portion.

The shift lever assembly may further include a support member disposed below the base, the support member having a base portion and a side portion disposed on one side of the base portion and having a support hole. The driving motor may be disposed on the other side of the base portion. The rotation shaft of the driving motor may extend through the support hole to be supported thereby.

The shifting PCB may be disposed on the base portion of the support member to be located on a bottom between the driving motor and the side portion of the support member.

When the knob is detected as being operated by a force exceeding a driving force of the driving motor, the shifting PCB may perform shifting by recognizing a gear selected in response to the operation of the knob as an actually operated gear.

The cover may be a piece having a fan-shaped cross-section, formed by longitudinally cutting a cylinder having a top surface and a bottom surface, may be configured to open or close the accommodation space, and may be rotated and inserted into the knob when the accommodation space is opened.

According to the shift lever assembly for a vehicle having the above-described configuration, the following effects can be obtained.

First, costs are reduced compared with other shift lever levers (or other shift lever assemblies) since a structure for operating a shift lever and a structure for operating a button are integrated into a single structure.

Second, since a driver can easily switch between operation modes according to his or her preference, the feeling of operation is significantly improved. In the case in which a button shift mode is used, when the user selects a gear using shift buttons, a knob is automatically moved, improving driving convenience.

Third, the shift lever assembly for a vehicle has a hybrid structure able to realize both a lever shift mode and a button shift mode using a single shift-by-wire (SBW) system, improving the product value of the shift lever assembly.

Fourth, when a driver erroneously operates a wrong button among shift buttons, the erroneous operation can be visually recognized immediately. Thus, it is possible to promptly switch the wrong gear into a desired gear using a knob, improving safety of the driver.

The methods and apparatuses of the present invention have other features and advantages which will be apparent from or are set forth in more detail in the accompanying drawings, which are incorporated herein, and the following Detailed Description, which together are configured to explain certain principles of the present invention.

Figure 1:
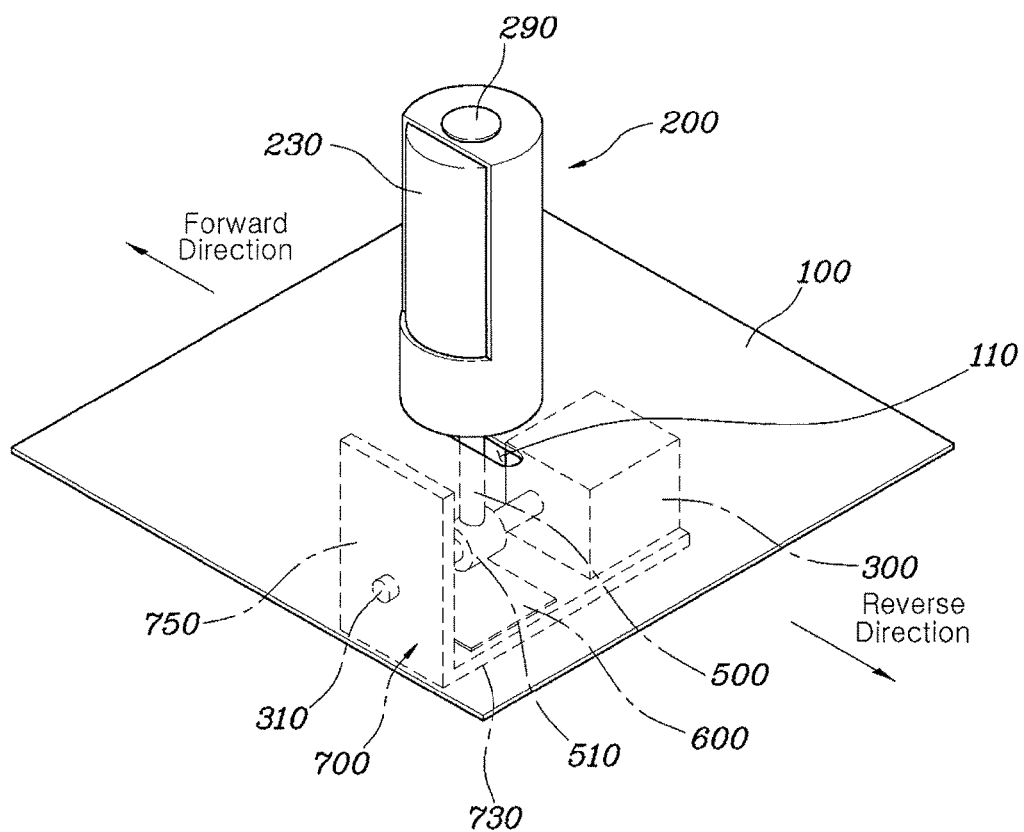
FIG. 1 is a perspective view illustrating a shift lever assembly for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for examples, specific dimensions, orientations, locations, and shapes will be determined in part by the particular intended application and use environment.

In the figures, reference numbers refer to the same or equivalent parts of the present invention through the several figures of the drawing.

DETAILED DESCRIPTION

Reference will now be made in detail to various embodiments of the present invention(s), examples of which are illustrated in the accompanying drawings. And described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents, and other embodiments, which may be included within the spirit and scope of the invention as defined by the appended claims.

Figure 2:
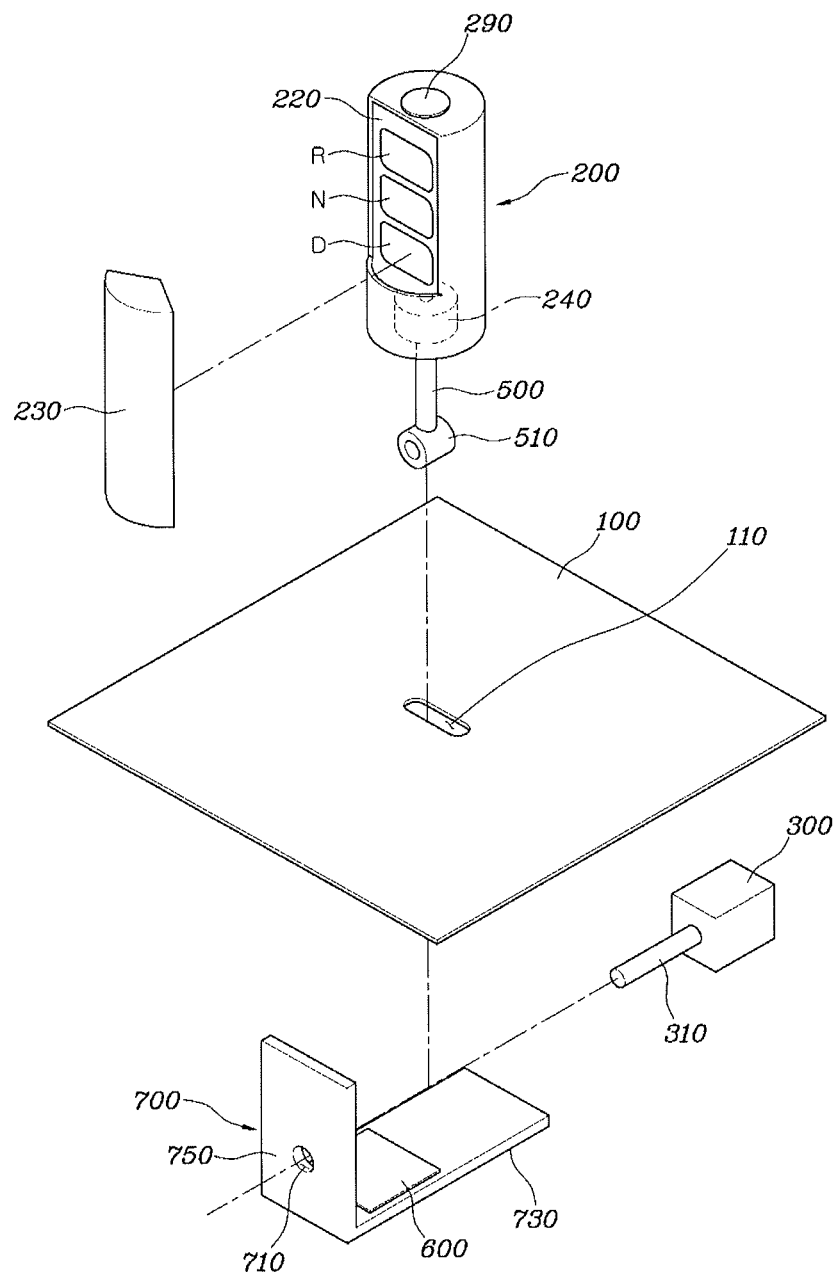
FIG. 2 is an exploded perspective view of the shift lever assembly illustrated in FIG. 1.
Figure 3:
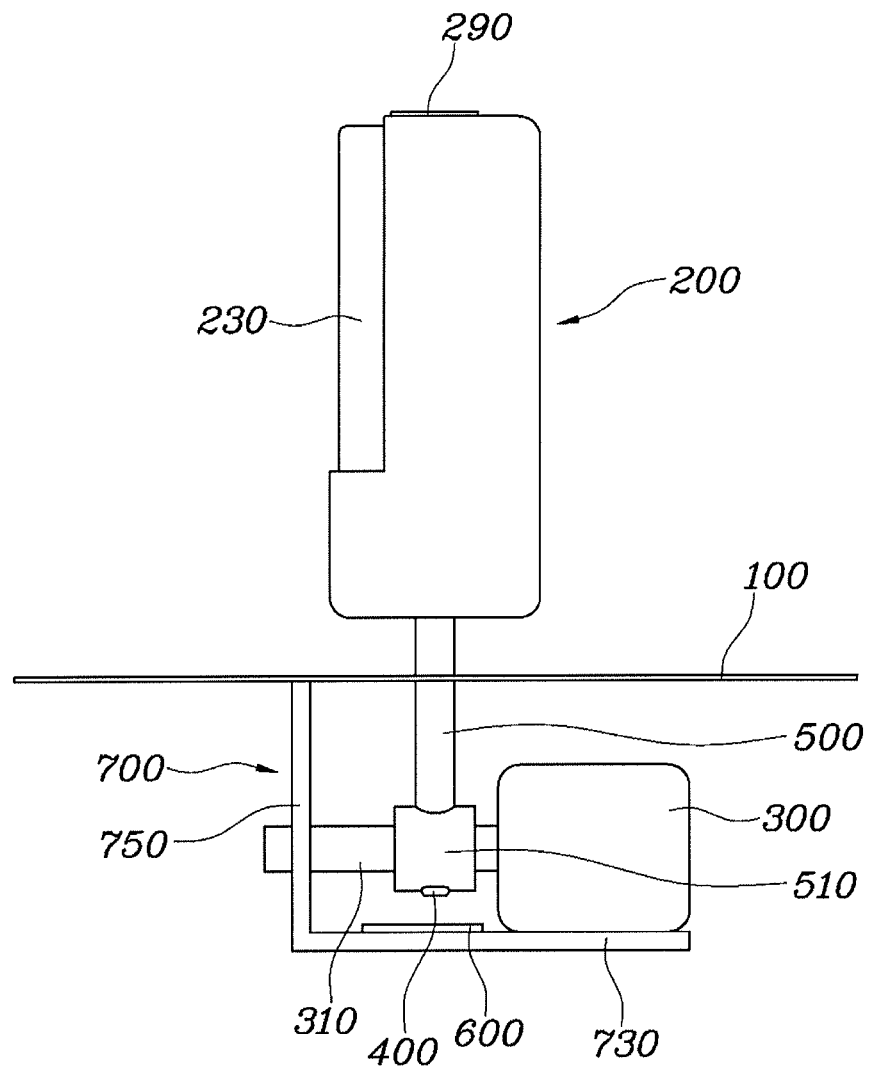
FIG. 3 is a side elevation view of the shift lever assembly illustrated in FIG. 1.
Figure 4:
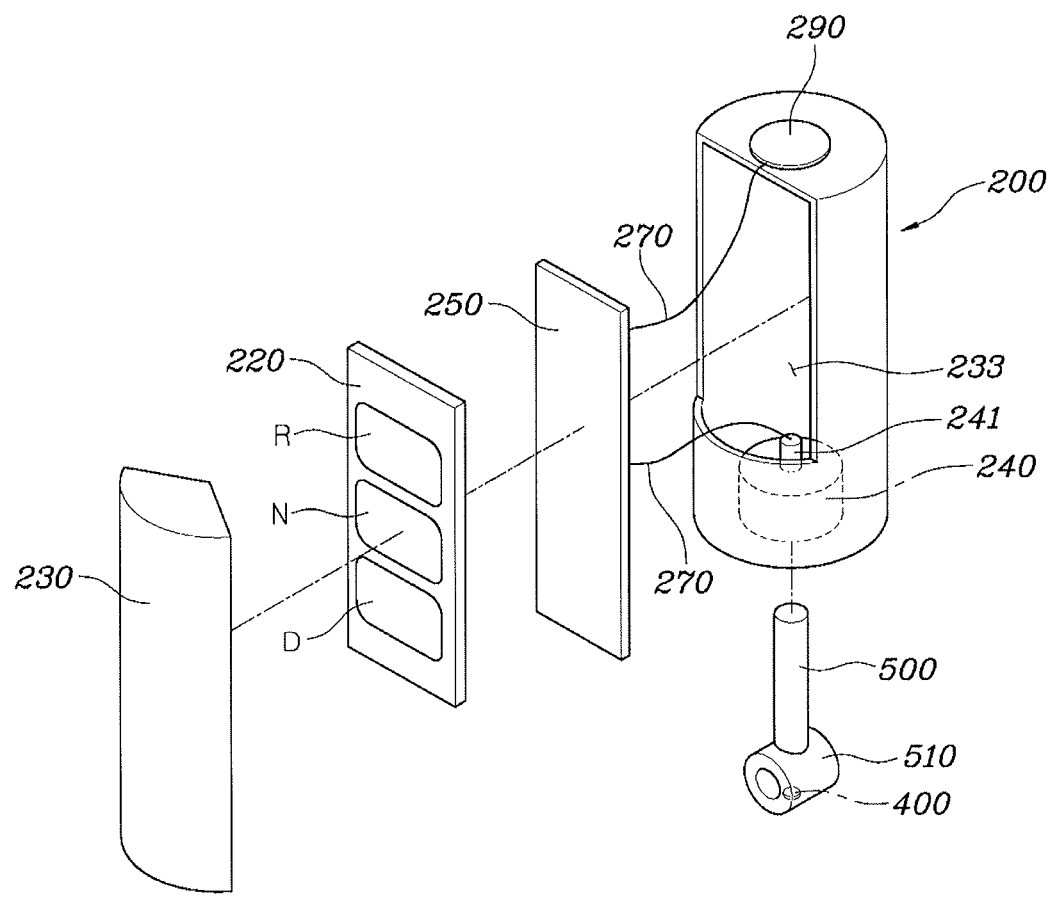
FIG. 4 is an exploded perspective view of the lever of the shift lever assembly illustrated in FIG. 1.
Figure 5:
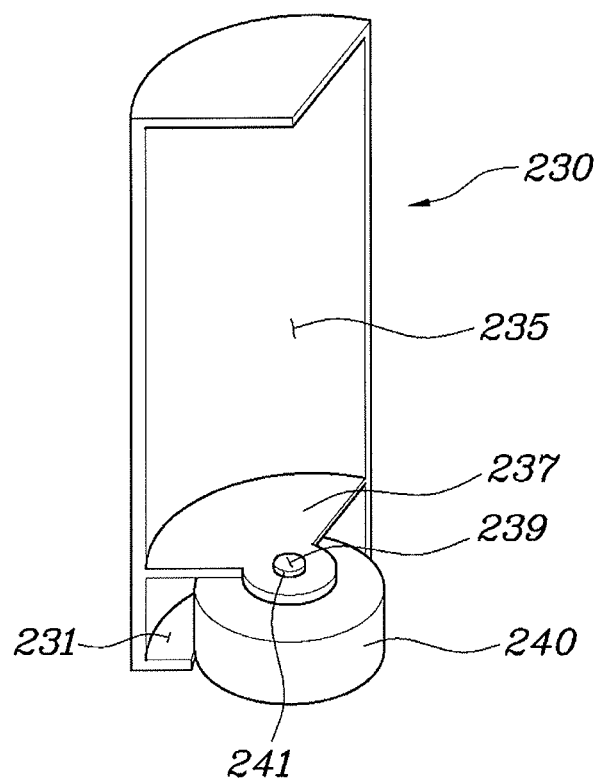
FIG. 5 is a detailed view of the cover of the shift lever assembly illustrated in FIG. 1.

FIG. 1 is a perspective view illustrating a shift lever assembly for a vehicle according to an exemplary embodiment of the present invention, FIG. 2 is an exploded perspective view of the shift lever assembly illustrated in FIG. 1, and FIG. 3 is a side elevation view of the shift lever assembly illustrated in FIG. 1. In addition, FIG. 4 is an exploded perspective view of the lever of the shift lever assembly illustrated in FIG. 1, while FIG. 5 is a detailed view of the cover 230 of the shift lever assembly illustrated in FIG. 1. It is desirable that the present invention is especially applied to a shift lever using a shift-by-wire (SBW) of a shift lever assembly for a vehicle.

As illustrated in FIG. 1 to FIG. 5, the shift lever assembly for a vehicle according to an exemplary embodiment of the present invention may include a base 100 having a hole 110; a knob 200 disposed above the base 100, having an accommodation compartment 233 formed therein to be opened or closed by a cover 230, and including a button type shift device disposed in the accommodation compartment 233 to perform shifting in response to button operations; a rod 500 extending downward from the knob 200 and though the hole 110 and having a magnet 400 disposed on a bottom portion thereof; a driving motor 300 including a rotation shaft 310 connected to the rod 500 and providing a driving force for pivoting the knob 200 at the time of driving; and a shift PCB 600 configured for detecting a gear (or a shift stage) by recognizing the magnet 400 and controlling the gear. Thus, the shift lever assembly for a vehicle may perform shifting by selectively using one of a lever shift mode, in which the gears are changed in response to the knob 200 being operated, and a button shift mode, in which the gears are changed in response to button operations.

The hole 110 is formed in the center of the base 100. It is desirable that the hole 110 is elongated in the front-rear direction of a vehicle as illustrated in FIG. 1 and FIG. 2.

The knob 200 has a cylindrical shape elongated in a top-bottom direction. The knob 200 is disposed above the base 100 and has the accommodation compartment 233 formed therein to be opened or closed by the cover 230. The button type shift device is disposed in the accommodation compartment 233 to perform shifting in response to button operations.

The cover 230 is a piece having a fan-shaped cross-section, formed by longitudinally cutting a cylinder having a top surface and a bottom surface. Since the radius of the cover 230 is smaller than that of the knob 200, the cover 230 is placed more inside compared with a cut portion of the accommodation compartment 233. The cover 230 is configured to open or close the accommodation compartment 233. When the accommodation compartment 233 is opened, the cover 230 is rotated and inserted into the knob 200. A separator diaphragm 237 is disposed inside of the cover 230 in the transverse direction of the vehicle, wherein an upper compartment 235 is formed above the separator diaphragm 237 and a lower compartment 231 is formed below the separator diaphragm 237. A coupling hole 239 is formed at the center of rotation of the separator diaphragm 237.

The button type shift device is disposed in the accommodation compartment 233 and includes a panel 220 provided with shift buttons, a button recognition PCB 250 connected to the panel 220 configured to recognize the operations of the shift buttons, and a rotation motor 240 rotating the cover 230.

The panel 220 extends in the top to bottom direction, i.e., a lengthwise direction. Accordingly, the shift buttons are disposed wherein a reverse (R) gear button R, a neutral (N) gear button N, and a drive (D) gear button D are selectively and sequentially disposed in the top to bottom direction. The R gear button R, the N gear button N, and the D gear button D are illustrated as being sequentially disposed in an exemplary embodiment of the present invention, but the arrangement of the shift buttons may be changed. The button recognition PCB 250 is disposed on the surface of the panel 220 that faces away from the shift buttons. When a driver operates one of the shift buttons, the button recognition PCB 250 receives an instruction and transfers the received instruction to the shift PCB 600. The shift PCB 600 performs shifting based on the received signal, i.e. instruction. The rotation motor 240 is disposed in the lower compartment 231 of the cover 230. When the rotation motor 240 rotates in a position in which a rotation shaft 241 of the rotation motor 240 is fitted into the coupling hole 239, the cover 230 is rotated to open or close the accommodation compartment 233. A step motor is available for the rotation motor 240.

A rotation button 290 is provided on the top portion of the knob 200. The rotation button 290 may be a touch sensor. The rotation button 290 and the rotation motor 240 are connected by a wire 270 wherein, in response to the rotation button 290 being operated, the rotation motor 240 is driven to rotate the cover 230 so that the shift buttons are exposed. In addition, the button recognition PCB 250 and the rotation motor 240 are connected by a wire 270. In particular, it is desirable that the rotation button 290, the button recognition PCB 250, and the rotation motor 240 are connected to one another by the wires 270. Alternatively, the button recognition PCB 250 may transmit a signal by wireless communication rather than wiring.

The rod 500 extends downward from the knob 200 and through hole 110. The rod 500 is in the shape of a bar elongated in the top to bottom direction of the vehicle. A cylindrical penetration portion 510 is provided on the bottom end portion of the rod 500. The rod 500 is oriented perpendicular to the side surface of the cylindrical penetration portion 510. The magnet 400 is disposed on the bottom surface of the circumferential surface of the cylindrical penetration portion 510.

The driving motor 300 is coupled to the rod 500, with the rotation shaft 310 being fitted into the cylindrical penetration portion 510. Thus, when the driving motor 300 is driven in the button shift mode, a driving force of the driving motor 300 is transferred to the knob 200 through the rod 500, pivoting the knob 200 in the direction of a selected gear, i.e. the front direction or the rear direction of the vehicle.

In addition, a support member 700 is provided below the base 100. The support member 700 has a base portion 730 and a side portion 750 disposed on one side of the base portion 730, with a support hole 710 being formed in the side portion 750. The driving motor 300 is disposed on the other side of the base portion 730 of the support member 700, and the rotation shaft 310 of the driving motor 300 extends through the support hole 710 to be supported thereby.

The shift PCB 600 is disposed on the base portion 730 of the support member 700. The shift PCB 600 performs control according to a gear detected by recognizing the magnet 400. The shift PCB 600 is disposed on a bottom between the driving motor 300 and the side portion 750 of the support member 700.

Figure 6:
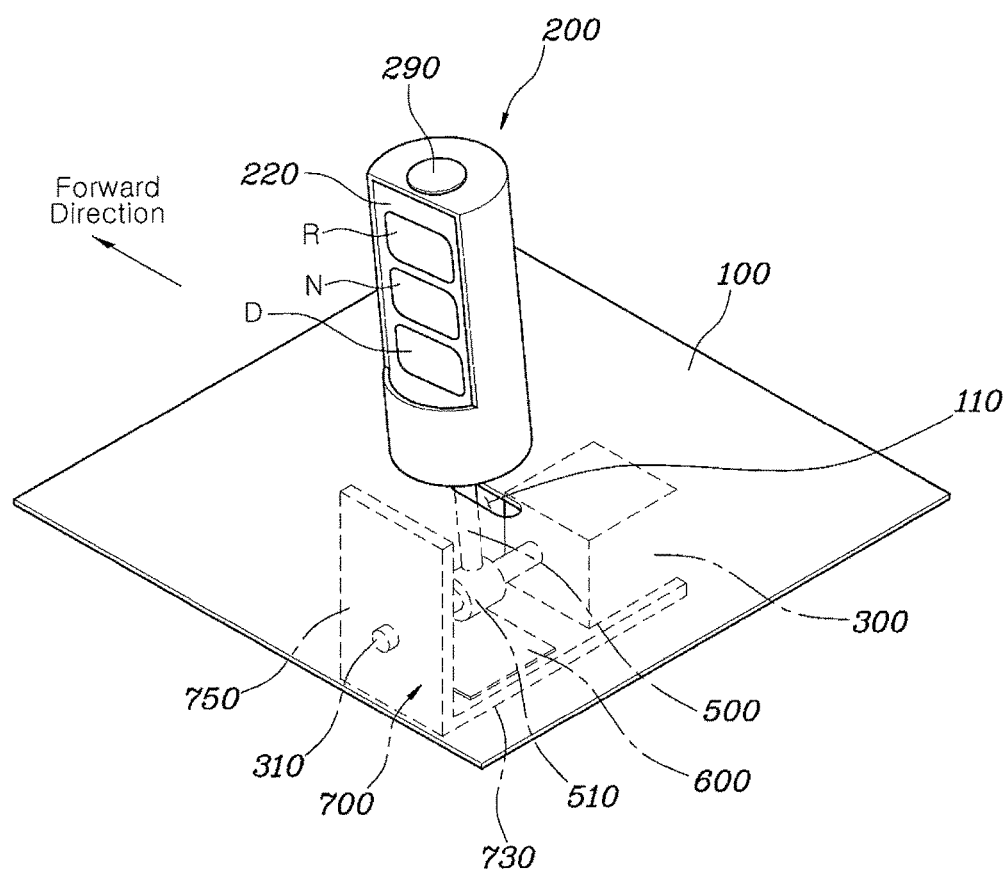
FIG. 6 and FIG. 7 are perspective views illustrating forwardly and backwardly moved positions in a button shift mode.
Figure 7:
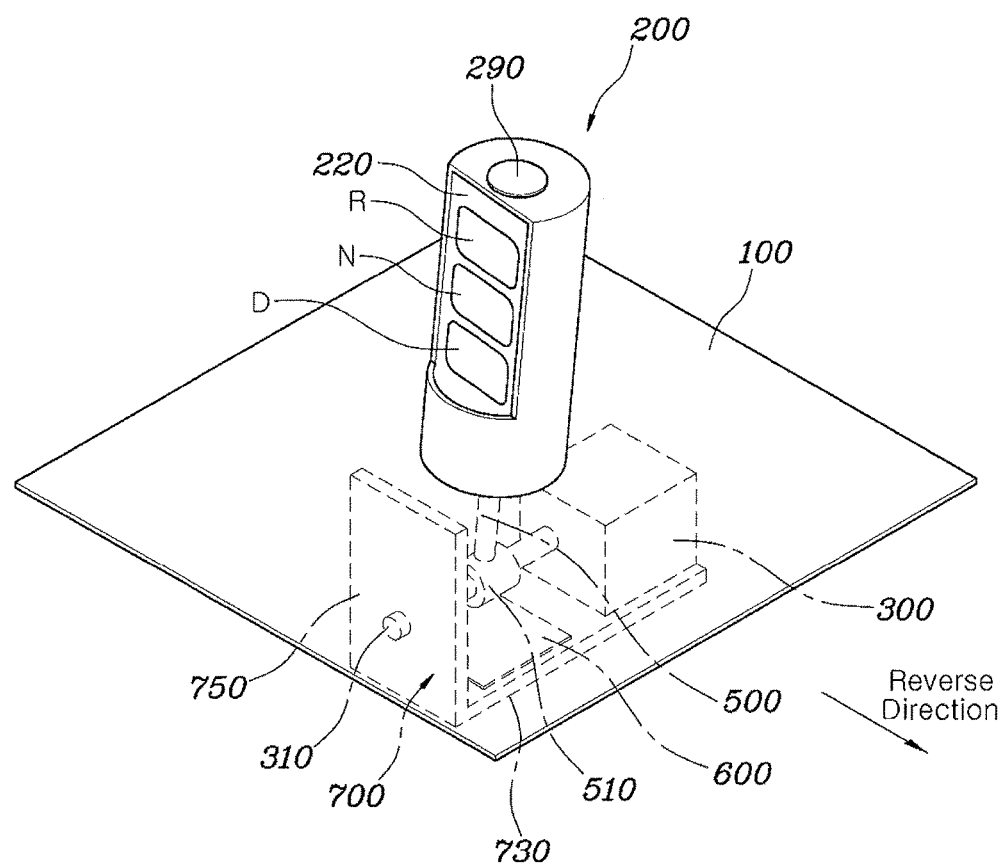

The operation of the shift lever assembly for a vehicle according to an exemplary embodiment of the present invention will be described in detail with reference to the accompanying drawings. First, FIG. 6 and FIG. 7 are perspective views illustrating forwardly and backwardly moved positions in a button shift mode.

When a driver intends to use the button shift mode, the button type shift device must be exposed from the knob 200. First, the driver places the knob 200 in the N gear position, i.e. a vertically erected position, and then, pushes the rotation button 290 disposed on the top portion of the knob 200. When a signal formed in response to the operation of the rotation button 290 is transferred to the button recognition PCB 250 through the wire 270 or wireless communication, the button recognition PCB 250 drives the rotation motor 240 to rotate the cover 230. Accordingly, the cover 230 is inserted into the accommodation compartment 233 of the knob 200, exposing the shift buttons.

When the shift buttons are exposed, the driver operates one of the shift buttons. In response to the shift button being operated by the driver, an instruction is transferred to the button recognition PCB 250, and the button recognition PCB 250 transfers a signal regarding a gear selected by the driver to the shift PCB 600. The shift PCB 600 drives the driving motor 300 based on the signal transferred from the button recognition PCB 250. When the driver selects the D gear button D, the driving motor 300 moves the knob 200 in the front direction of the vehicle (FIG. 6). When the driver selects the R gear button R, the driving motor 300 moves the knob 200 in the rear direction of the vehicle (FIG. 7). In addition, when the driver selects the N gear button (N), the driving motor 300 moves the knob 200 to the neutral (vertical) position. At the same time, the shift PCB 600 detects the position of the magnet 400 to detect a final gear, determining whether or not the operation is ordinary. When the driver intends to close the accommodation compartment 233, the driver withdraws the cover 230 to close the accommodation compartment 233 by operating the rotation button 290 again.

While the button shift mode as above described is being performed, the user may erroneously operate a wrong button among the shift buttons. In the instant case, when the driver selects a correct gear by manually operating the knob 200, a gear change to the correct gear can be performed. To prevent the erroneous operation, at the time of designing the vehicle, the shift PCB 600 is set wherein, when the shift PCB 600 detects that the knob 200 is operated by a force exceeding the driving force of the driving motor 300, the shift PCB 600 stops the driving motor 300 and performs shifting by recognizing a gear selected in response to the operation of the knob 200 as an actually operated gear.

Figure 8:
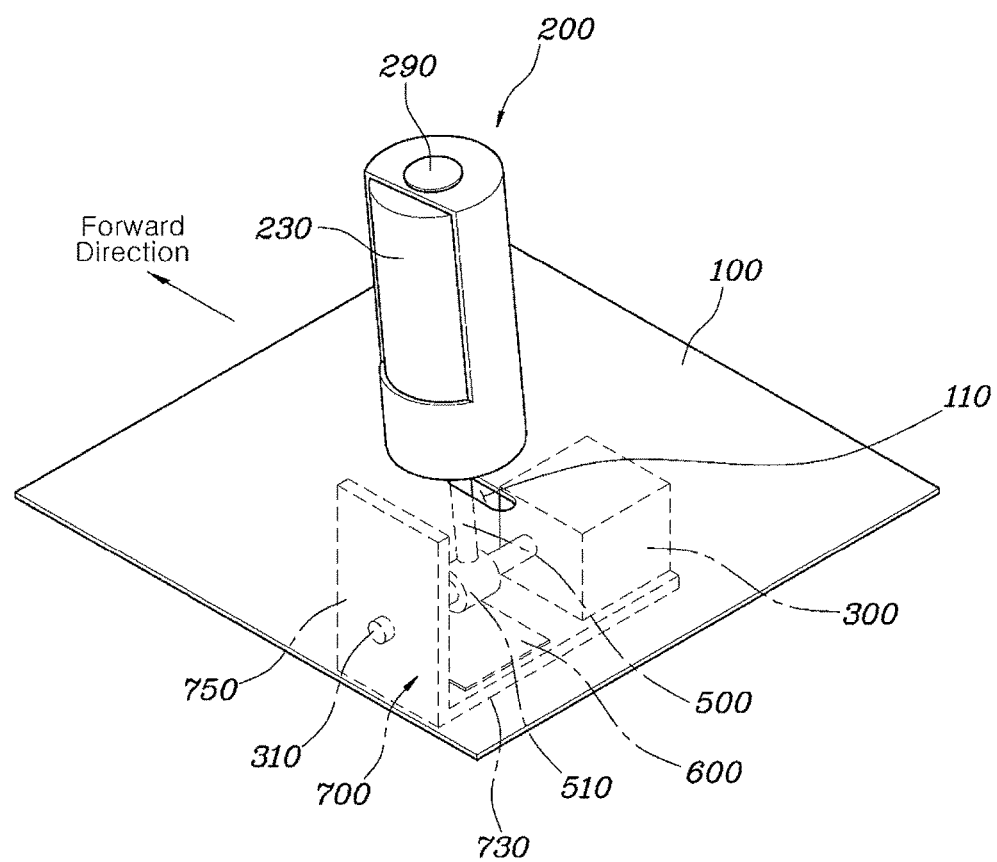
FIG. 8 and FIG. 9 are perspective views illustrating forwardly and backwardly moved positions in a lever shift mode.
Figure 9:
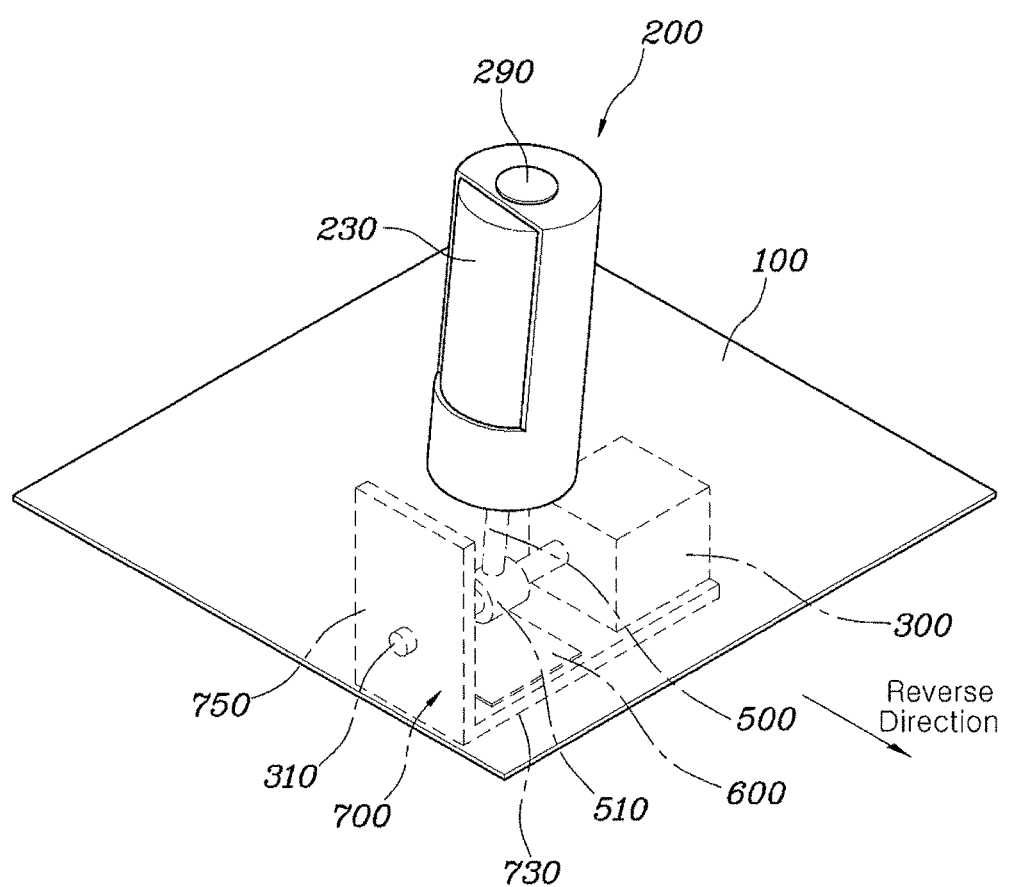

Next, FIG. 8 and FIG. 9 are perspective views illustrating forwardly and backwardly moved positions in a lever shift mode. In the case in which the driver intends to use the lever shift mode, shifting is performed in the same manner as in the other existing shift levers. When the knob 200 is moved in the front direction of the vehicle, the D gear is selected. When the knob 200 is moved to the neutral (vertical) position, the N gear is selected. When the knob 200 is moved in the reverse direction of the vehicle, the R gear is selected.

Accordingly, the shift lever assembly for a vehicle as described above has a hybrid structure able to realize both the lever shift mode and the button shift mode using a single SBW system and has following effects.

First, costs are reduced compared with other shift levers (or other shift lever assemblies) since a structure for operating a shift lever and a structure for operating a button are integrated into a single structure.

Second, since a driver can easily switch between operation modes according to his or her preference, the feeling of operation is significantly improved. In the case in which the button shift mode is used, when the user selects a gear using the shift buttons, the knob is automatically moved, improving driving convenience.

Third, the hybrid structure of the shift lever assembly for a vehicle can realize both the lever shift mode and the button shift mode using a single SBW system, improving the product value of the shift lever assembly.

Fourth, when the driver erroneously operates a wrong button among the shift buttons, the erroneous operation can be visually recognized immediately. Thus, it is possible to promptly switch the wrong gear into a desired gear using the knob, improving safety of the driver.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical applications, to thereby enable others skilled in the art to make and utilize various exemplary embodiments of the present invention, as well as various alternatives and modifications thereof. It is intended that the scope of the invention be defined both Claims appended hereto and their equivalents.

What is claimed is:

1. A shift lever assembly for a vehicle, the shift lever assembly comprising:
    a base having a hole;
    a knob disposed above a base, having an accommodation space formed therein to be opened or closed by a cover, and including a button type shift device disposed in the accommodation space to perform shifting in response to button operations;
    a rod extending downward from the knob and through the hole and having a magnet disposed on a bottom portion thereof;
    a driving motor including a rotation shaft connected to the rod and providing a driving force for rotating the knob at a time of driving; and
    a shifting printed circuit board (shifting PCB) detecting a gear by recognizing the magnet and controlling the gear,
    wherein shifting is performed by selectively using one of a lever shift mode, in which gears are changed in response to the knob being operated, and a button shift mode, in which the gears are changed in response to button operations.

2. The shift lever assembly according to claim 1, wherein the button type shift device includes a panel including shift buttons, a button recognition printed circuit board (button recognition PCB) connected to the panel to recognize operations of the shift buttons, and a rotation motor rotating the cover.

3. The shift lever assembly according to claim 2, wherein the shift buttons include a reverse gear button, a neutral gear button, and a drive gear button selectively and sequentially disposed in a top-bottom direction.

4. The shift lever assembly according to claim 2, wherein the knob further includes a rotation button disposed on a top portion thereof,
    wherein the rotation button, the button recognition PCB, and the rotation motor are connected by wires, such that, in response to the rotation button being operated, the rotation motor is driven to rotate the cover wherein the shift buttons are exposed.

5. The shift lever assembly according to claim 2, wherein the cover includes a separator diaphragm therein, the separator diaphragm being disposed below a bottom surface of the panel in a transverse direction of the vehicle and having a coupling hole formed at a center thereof, wherein the rotation shaft of the rotation motor is coupled to the coupling hole of the cover, and wherein the cover is rotated when the rotation motor is rotated.

6. The shift lever assembly according to claim 1, wherein the rod includes a cylindrical penetration portion on a bottom end thereof, the rod being oriented perpendicular to a side surface of the cylindrical penetration portion,
    wherein the driving motor is coupled to the rod, with the rotation shaft of the driving motor being fitted into the cylindrical penetration portion of the rod, and wherein the rod is pivoted in a predetermined direction of the vehicle when the driving motor is driven.

7. The shift lever assembly according to claim 6, wherein the magnet is disposed on a bottom surface of a circumferential surface of the cylindrical penetration portion.

8. The shift lever assembly according to claim 1, further including a support member disposed below the base, the support member having a base portion and a side portion disposed on a first side of the base portion and having a support hole, wherein the driving motor is disposed on a second side of the base portion, and the rotation shaft of the driving motor extends through the support hole to be supported.

9. The shift lever assembly according to claim 8, wherein the shifting PCB is disposed on the base portion of the support member to be located on a bottom between the driving motor and the side portion of the support member.

10. The shift lever assembly according to claim 1, wherein, when the knob is detected as being operated by a force more than a driving force of the driving motor, the shifting PCB performs shifting by recognizing a gear selected in response to the operation of the knob as an operated gear.

11. The shift lever assembly according to claim 1, wherein the cover is a piece having a fan-shaped cross-section, formed by longitudinally cutting a cylinder having a top surface and a bottom surface, is configured to open or close the accommodation space, and is rotated and inserted into the knob when the accommodation space is opened.

* * * * *